Patented Apr. 5, 1949

2,466,336

UNITED STATES PATENT OFFICE 2,466,336

PRODUCTION OF SULFUR TRIOXIDE

Leslie Christopher Strang, Sunbury-on-Thames, England, assignor to Anglo-Iranian Oil Company Limited, London, England, a British joint-stock corporation No Drawing. Application August 28, 1945, Serial No. 613,203. In Great Britain October 4, 1944

10 Claims. (Cl. 23—175)

The production and refining of petroleum products calls for the use of large quantities of sulphuric acid, as for example in the refining of hydrocarbon distillates, the production of alkylates by the sulphuric acid-alkylation process, and the production of hydrochloric acid for acid treating of wells.

It is customary to produce sulphuric acid by burning sulphur to yield sulphur dioxide, the sulphur dioxide being then oxidised catalytically to yield sulphur trioxide, which in turn is dissolved in the acid to produce concentrated sulphuric acid.

In oil refineries and particularly those situated in inaccessible or difficultly accessible localities the high initial cost of plant and transport render uneconomic the purchase of sulphuric acid made abroad for use in such refineries, for which reason in many refineries in such localities the acid is manufactured on the spot.

It is known that crude petroleum in most cases contains appreciable quantities of sulphur in combined form, the sulphur content increasing as the boiling range of the petroleum fraction increases. It is an object of the invention to utilise the combined sulphur already present in petroleum for the production therefrom of sulphur dioxide, which in turn is converted according to known methods into sulphuric acid, thereby reducing or avoiding the need of the supply of sulphur or sulphuric acid from outside sources. It is thus a practical advantage of the process of the invention that the recovery of sulphur from petroleum fractions incidentally result in refining them.

The process of the invention thus comprises the following steps in their order, namely, the catalytic hydrogenation of the combined sulphur in petroleum fractions to produce hydrogen sulphide as well as refined petroleum products, the separation of the hydrogen sulphide in good concentration, the oxidation of hydrogen sulphide to produce sulphur dioxide and the treatment of the sulphur dioxide product by known catalytic methods to yield sulphur trioxide.

The catalytic hydrogenation step is carried out under conditions that may vary according to the fractions to which it is applied. In general the following catalysts may advantageously be used namely, the oxides and sulphides of aluminium, iron, nickel, cobalt, chromium, molybdenum, copper, manganese and tungsten; metals such as sodium, potassium, lithium, calcium, zinc, aluminium, manganese, iron, nickel, cobalt or copper; compounds such as molybdates, thiomolybdates, thiotungstates, and aluminates of metals of the 6th group, either alone or in association with other catalysts.

In order to secure long periods of use of the hydrogenation catalyst the temperature in the hydrogenation stage may generally be maintained at or below 850° F., and usually a temperature of from 700 to 750° F. will be satisfactory for any petroleum fraction.

The pressure variable is more critical in that a pressure of the order of 150 to 350 lbs./sq. in. will usually be satisfactory for the refining of distillates, whereas to ensure adequate sulphur removal from gas oils and higher fractions, it is necessary to increase the pressure to 1,000 lbs./sq. in. or higher. The actual pressure used will depend on the degree of sulphur removal required, and on economic considerations, but may be as high as 3,000 lbs./sq. in. to secure substantially complete sulphur removal from fractions in the fuel oil range.

The amount of hydrogen re-cycled may also vary within wide limits. In the case of a normal crude oil the consumption of hydrogen may be quite small, but the quantity of hydrogen present should be sufficient to maintain the vaporisation of the oil under the operating conditions. Stated within wide limits, the amount will usually be between 1,000 and 8,000 cu. ft. of hydrogen per barrel of feedstock, according to the operating pressure.

According to the invention therefore, a fraction from crude petroleum is catalytically hydrogenated to yield a product substantially free from organic sulphur. The product of de-pressuring yields a gas mixture, which is sometimes hereinafter referred to as the hydrogen-sulphide gas mixture or as the feed gas, consisting essentially of hydrogen sulphide, hydrogen and methane. This gas mixture is burned in the presence of excess air to convert the hydrogen-sulphide therein to sulphur dioxide, the quantity of air used being so determined that the gas mixture thus obtained, which is sometimes hereinafter referred to as the $SO_2$ gas mixture or as the composite gas, is of such composition that it is adapted for the catalytic conversion of the $SO_2$ therein to $SO_3$ by known methods, as for example in the use as catalyst of vanadium pentoxide.

The invention comprises the conditions hereinafter described, by way of example applied to the production of sulphur dioxide and the desulphurisation of a gas oil of Iranian origin having the following characteristics:

| | |
|---|---|
| SP. gr. at 60° F. | .841 |
| I. B. P. °C | 221.5 |
| F. B. P. °C | 372 |
| Aniline point °C | 73 |
| Refractive index | 1.4679 |
| Per cent sulphur (by weight) | 0.67 |

In carrying the invention into effect this gas oil is passed over a catalyst, consisting of molybdenum trioxide deposited on alumina, at a rate equivalent to one volume of gas oil per volume of catalyst per hour. The temperature in the reaction zone is maintained at 750° F. and the pressure at 1,000 lbs./sq. in., 4,000 cubic feet of hydrogen per barrel of feedstock being continuously recycled to the reaction zone.

The concentration of hydrogen sulphide in the recycle hydrogen, may be permitted to build up to a state of equilibrium, reached when the recycle hydrogen contains a mol percentage of hydrogen sulphide of the order of 1.1; thereafter the whole of the hydrogen sulphide may be removed in the gas oil product. This product may then be passed to a flash chamber in which it is de-pressured. The feed gas thus obtained has the following approximate average analysis.

| | Per cent mol. |
|---|---|
| $H_2S$ | 42 |
| $H_2$ | 44 |
| $CH_4$ | 14 |

This hydrogen-sulphide gas mixture may be burnt directly in the presence of excess air to yield a composite gas having the following approximate composition.

| | Per cent mol. |
|---|---|
| $SO_2$ | 4.9 |
| $O_2$ | 9.8 |
| $N_2$ | 82.7 |
| $CO_2$ | 1.6 |

To produce a suitable composite gas with a feed gas of the stated analysis, approximately 8 volumes of air is required per volume of the feed gas. This composite gas may be passed directly over vanadium pentoxide at a temperature of 360° C., under atmospheric pressure to produce approximately a theoretical yield of the desired $SO_3$ product.

I have found that the hydrogen-sulphide gas mixture as stated above is rather critical. The percentage of hydrogen sulphide may not be under about 40% mol. since it is essential that the $SO_2$ gas mixture should contain at least 4.5 mol % $SO_2$.

The presence of hydrocarbons higher than methane is disadvantageous and any substantial quantities of those hydrocarbons should be excluded. The reason for this is that where hydrocarbons higher than methane are present considerably higher quantities of air will be required to convert those hydrocarbons to $CO_2$ and water, with the result that a considerably increased volume of nitrogen will be present in the burnt gas and tend to reduce the volume of $SO_2$ present to less than the minimum amount necessary.

Thus to ensure conditions of precision in the contact process, the $SO_2$ mixture should be so determined as to contain approximately 5% mol of $SO_2$ together with about 200% oxygen in excess of that theoretically required for the oxidation of $SO_2$ to $SO_3$.

If the gas from the hydrofining step, that is, the feed gas contains an unduly small concentration of hydrogen sulphide, whereby it is thus not possible to obtain a sufficiently high $SO_2$ content in the composite gas, the $SO_2$ concentration may be increased by direct addition of $SO_2$. That is to say, where the sulphur content of the fraction to be refined is low, a conventional sulphur burning process may be employed to increase the concentration of the sulphur dioxide in the composite gas and thus ensure precision in the composition of the composite gas.

I claim:

1. A process for the production of sulphur trioxide comprising treating a normally liquid fraction derived from petroleum and containing combined sulphur to convert the combined sulphur to hydrogen sulphide by subjecting the fraction to catalytic hydrogenation at a temperature in the range of from about 700° F. to about 850° F., at a pressure in the range of from about 150 lbs./sq. in. to about 3000 lbs./sq. in. sufficient to secure conversion of substantially all the combined sulphur to hydrogen sulphide, and in the presence of a proportion of hydrogen sufficient to maintain the vapourisation of the fraction under the operating conditions, the hydrogen present having a content of hydrogen sulphide substantially equivalent to an equilibrium concentration of hydrogen sulphide in the hydrogen under the operating conditions, thereby to yield as a product the treated fraction substantially free from organic sulphur but containing substantially the whole of the hydrogen sulphide formed; de-pressuring the treated fraction to yield a feed gas consisting essentially of hydrogen sulphide, hydrogen and methane, in which the percentage of hydrogen sulphide is not below about 40% mol.; burning the feed gas thus obtained in the presence of a quantity of air sufficient to yield a sulphur dioxide gaseous mixture containing at least 4.5% mol. of $SO_2$ together with about 200% oxygen in excess of that theoretically required for catalytic conversion of its content of sulphur dioxide to sulphur trioxide; and, catalytically converting the content of sulphur dioxide in said gaseous mixture to sulphur trioxide.

2. A process as specified in claim 1, in which the sulphur trioxide produced is added to sulphuric acid for its concentration.

3. A process as specified in claim 1, in which the fraction derived from petroleum is a petroleum distillate and in which the catalytic hydrogenation of the combined sulphur in the fraction is carried out under conditions in which temperature is maintained in the range of from about 700° F. to about 750° F., and under pressure of the order of 150 to 350 lbs. per square inch.

4. A process as specified in claim 1 in which the catalytic hydrogenation of the combined sulphur in gas oils and higher fractions is carried out under conditions, in which the pressure is maintained at from 1,000 to 3,000 lbs. per square inch according to the degree of sulphur removal required.

5. A process as specified in claim 1, which in the final stage is carried out in the presence of oxygen in considerable excess of that theoretically required for the oxidation of sulphur dioxide to sulphur trioxide, the conversion being carried out in the use of a known catalyst such as vanadium pentoxide.

6. A process as specified in claim 1, in which an unduly small concentration, less than about 40% mol., of hydrogen sulphide is available in the feed gas obtained from the treated fraction and consequently a low content, less than 4.5% mol., of sulphur dioxide is obtained in the gaseous mixture, and in which the sulphur dioxide concentration of the mixture is increased to at least 4.5% mol. by direct addition of sulphur dioxide to the mixture subjected to catalytic conversion into sulphur trioxide in the final stage.

7. A process as specified in claim 1, in which the amount of hydrogen used in the hydrogenation stage is between 1,000 to 8,000 cu. ft. per barrel of the feedstock, according to the operating pressure.

8. A process as specified in claim 1, in which the catalytic hydrogenation of the combined sulphur in gas oils and higher fractions is carried out by passing the fraction at a rate equivalent to one volume of gas oil per volume of catalyst per hour over molybdenum trioxide deposited on alumina.

9. A process as specified in claim 1 in which the quantity of air present is approximately eight volumes of air per volume of feed gas burned.

10. A process as specified in claim 1 in which the hydrogenation is carried out in the presence of recycle hydrogen.

LESLIE CHRISTOPHER STRANG.

REFERENCES CITED

The following references are of record in the file of this patent:

UNITED STATES PATENTS

| Number | Name | Date |
|---|---|---|
| 2,003,442 | Hechenbleikner | June 4, 1935 |
| 2,042,298 | Davis | May 26, 1936 |

FOREIGN PATENTS

| Number | Country | Date |
|---|---|---|
| 558,385 | Great Britain | Jan. 4, 1944 |